JOHN BLACKWOOD.
Improvement in Three Horse Equalizer.
No. 124,537.  Patented March 12, 1872.
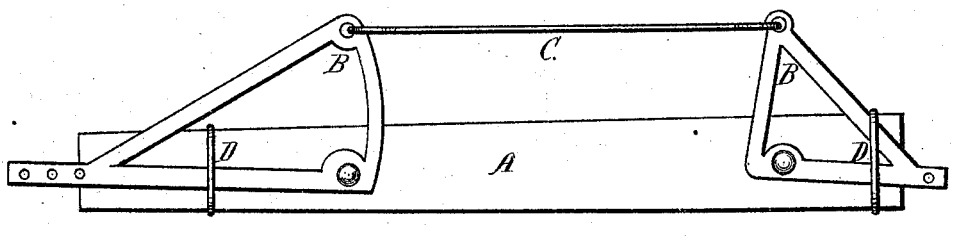
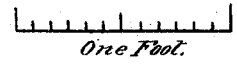
One Foot.
Witnesses.  Inventor.

: 124,537

UNITED STATES PATENT OFFICE.

JOHN BLACKWOOD, OF LITHOPOLIS, OHIO.

IMPROVEMENT IN THREE-HORSE EQUALIZERS.

Specification forming part of Letters Patent No. 124,537, dated March 12, 1872.

*To all whom it may concern:*

Be it known that I, JOHN BLACKWOOD, of Lithopolis, Ohio, have invented a new and useful improvement in the method of hitching three horses abreast to gang-plows, wagons, reapers, or any other kind of machine requiring three-horse draft, without creating side draft, known as "Blackwood equalizer;" and I do hereby declare that the following is a full, clear, and exact description thereof, which will enable others skilled in the art to make and use the same, reference being had to the accompanying drawing forming part of this specification, which is a top view of my equalizer.

A is a piece of timber, of proper size, on which I secure two triangles, B B. The one I make of equal lengths; the other, as long again as wide. To the back corners of each I attach a draft-rod, C. The center hole at the draft end is the equal draft, by the additional hole on each side of which the draft can be changed to suit the strength of the third horse. D D are iron guides, to prevent the triangles from lifting when the horses pull; and they also answer the purpose of stays.

By the use of the aforesaid invention three horses can be hitched to a plow or other vehicle without creating side draft, and, being nearer the load and each horse compelled to do his portion of the work, I find that three horses will perform the work of four hitched in the ordinary way.

Having thus described my invention, I claim as new and desire to secure by Letters Patent—

The equalizing-triangles B B, in connection with the draft-rod C, guides D D, and beam A, of whatever material made, in connection with each other, substantially as herein shown and described, and for the purposes set forth.

JOHN BLACKWOOD.

Witnesses:
    JULIA SPANGHER,
    JOHN MOUHART.